(12) United States Patent
Ehnot

(10) Patent No.: US 11,232,697 B1
(45) Date of Patent: Jan. 25, 2022

(54) DETECTION APPARATUS CONFIGURED FOR USE WITH A MOBILE DEVICE

(71) Applicant: Dave Ehnot, East Orleans, MA (US)

(72) Inventor: Dave Ehnot, East Orleans, MA (US)

( * ) Notice: Subject to any disclaimer, the term of this patent is extended or adjusted under 35 U.S.C. 154(b) by 0 days.

(21) Appl. No.: 17/148,749

(22) Filed: Jan. 14, 2021

Related U.S. Application Data

(60) Provisional application No. 62/995,138, filed on Jan. 14, 2020.

(51) Int. Cl.
| | |
|---|---|
| *G08B 21/22* | (2006.01) |
| *G08B 21/18* | (2006.01) |
| *G06F 1/16* | (2006.01) |
| *G08B 5/36* | (2006.01) |
| *H04M 1/02* | (2006.01) |

(52) U.S. Cl.
CPC ........... *G08B 21/22* (2013.01); *G06F 1/1656* (2013.01); *G08B 5/36* (2013.01); *G08B 21/182* (2013.01); *H04M 1/026* (2013.01)

(58) Field of Classification Search
CPC .............. G08B 15/004; G08B 21/0453; G08B 25/001; G08B 25/006; G08B 25/009; G08B 25/016; G08B 25/10; G08B 29/12
USPC .... 340/539.1, 531, 501, 517–518, 506, 540, 340/539.26, 7.6
See application file for complete search history.

(56) References Cited

U.S. PATENT DOCUMENTS

| | | | | |
|---|---|---|---|---|
| 6,115,620 | A * | 9/2000 | Colonna | H04M 1/0214 379/433.02 |
| 6,560,467 | B1 * | 5/2003 | Kim | H04M 19/04 340/7.6 |
| 10,735,909 | B1 * | 8/2020 | Klinkner | H04W 4/021 |
| 11,026,502 | B1 * | 6/2021 | Erold | A45F 5/004 |
| 2011/0086632 | A1 * | 4/2011 | Tumey | H04M 1/66 455/421 |
| 2013/0298208 | A1 * | 11/2013 | Ayed | H04L 27/00 726/6 |
| 2014/0364162 | A1 * | 12/2014 | Juang | H04W 52/246 455/522 |
| 2016/0091606 | A1 * | 3/2016 | Shin | G01S 15/93 367/112 |
| 2017/0278307 | A1 * | 9/2017 | Uetabira | G01S 17/93 |
| 2019/0109977 | A1 * | 4/2019 | Dutton | H04N 5/3454 |
| 2020/0098340 | A1 * | 3/2020 | Wengelnik | B60Q 3/85 |
| 2020/0219376 | A1 * | 7/2020 | Haviv | H04W 4/38 |
| 2020/0356094 | A1 * | 11/2020 | Gagne | G01S 17/89 |

* cited by examiner

*Primary Examiner* — Daniel Previl

(74) *Attorney, Agent, or Firm* — Bay State IP, LLC

(57) ABSTRACT

An apparatus attached or integrated into a cellular phone that will alert the phone user to objects generally in front of the user that are within a preselected distance. The invention can also include additional features such as an auxiliary power supply such as a battery or energy harvesting device, or a protective cover to prevent damage to the phone.

9 Claims, 5 Drawing Sheets

DETECTION APPARATUS CONFIGURED FOR USE WITH A MOBILE DEVICE

CROSS REFERENCE TO RELATED APPLICATION

This application claims the benefit of and takes priority from U.S. Provisional Patent Application Ser. No. 62/995,138 filed on Jan. 14, 2020, the contents of which are herein incorporated by reference.

BACKGROUND OF THE INVENTION

Field of the Invention

This invention relates generally to a detection apparatus for cellular phones, and more particularly to an apparatus configured for use with a mobile device that includes a sensor that can detect and determine the range of an object within a preselected distance to the sensor.

Description of the Related Art

Cellular phone users are increasingly using the phone during times when they are performing other tasks. One prevalent non-cell phone task is walking. A prevalent cell phone task is texting. When the two are combined the user is required to look at the phone screen while they move forward with limited or inconsistent view of the path ahead. Often the comprised view allows the user to enter into dangerous situations such as colliding with stationary objects, moving objects, entering into congested areas, entering into uneven or sloping paths and other dangerous or disruptive situations.

Software applications have been developed for the phone which allow the user to see the environment directly in front of the phone's camera. This method is ineffective because the camera is usually pointed at the ground and does not provide information of objects ahead of the user. In addition, the text activity is difficult to perform with the changing background and essentially makes the situation more dangerous. Also, the software solution does not assist when the user is talking or listening on the phone.

What is needed by the cellular phone industry is an apparatus either integrated into the phone or external to the phone or partially within the phone and external to the phone that provides effective warning of dangerous situations in front of the user. The invention described provides a solution to these needs.

SUMMARY OF THE INVENTION

The instant apparatus and system, as illustrated herein, is clearly not anticipated, rendered obvious, or even present in any of the prior art mechanisms, either alone or in any combination thereof. Thus, the several embodiments of the instant apparatus are illustrated herein.

A primary object of the instant invention is to provide a new apparatus either integrated into an electronic device or external to the device to provide effective warning of dangerous situations in front of a user.

Another object of the instant invention is to provide a warning apparatus which comprises a forward-looking sensor selected from the group consisting of an infrared transceiver, a laser range finder, a radar system, and an ultrasonic sensor array to detect any objects within a preselected distance in front of a user of the mobile device.

In one aspect, provided is a new apparatus comprising a distance measuring sensor which can be fully integrated into a handheld electronic device such as a cell phone or be a separate standalone unit in a case that attaches to the phone via a mounting mechanism such as a snap, a clamp, a cover that encapsulates the phone, adhesives, or magnets.

Accordingly, certain aspects are directed to a component that generates a warning notification when an object is within a preselected distance to an electronic device user. Such a warning system requires a sensor such as an infrared transceiver, laser range finder, radar system, ultrasonic sensor arrays or other distance measuring devices. These devices activate a human interface device such as a light, speaker, vibration motor or other devices that communicate the warning to the user.

The system can be fully integrated into the phone or be a separate unit in a case that attaches to the phone by either a snap mechanism, a cover that encapsulates the phone, adhesive, or other method.

A hybrid system that uses components and features in an apparatus external to the phone and components within the phone is another possible configuration of the devices.

Another object of the instant invention is to provide for a device that allows for individuals to maintain proper social distancing by preselecting a lowest distance setting.

Another object of the instant invention is to provide social distancing reminder, alert and warning system by detecting an object that is within six feet of a user of a mobile device with the detection apparatus.

The apparatus requires electric power to operate. This power can be supplied by the phones internal power supply or with a device such as a battery or energy harvester that is installed within the external case. This supply can be used to power the phone or other external devices. The apparatus' case can be configured to provide protection to the phone in the event of a drop, water exposure or other potential damaging event.

There has thus been outlined, rather broadly, the more important features of detection apparatus configured for use with a mobile device, in order that the detailed description thereof that follows may be better understood, and in order that the present contribution to the art may be better appreciated. There are additional features of the system that will be described hereinafter and which will form the subject matter of the claims appended hereto.

In this respect, before explaining at least one embodiment of the system in detail, it is to be understood that the system is not limited in its application to the details of construction and to the arrangements of the components set forth in the following description, and/or illustrated in the drawings. The system is capable of other embodiments and of being practiced and carried out in various ways. Also, it is to be understood that the phraseology and terminology employed herein are for the purpose of description and should not be regarded as limiting.

These together with other objects of the system, along with the various features of novelty, which characterize the system, are pointed out with particularity in the claims annexed to and forming a part of this disclosure. For a better understanding of the system, its operating advantages and the specific objects attained by its uses, reference should be made to the accompanying drawings and descriptive matter in which there are illustrated preferred embodiments of the system.

The foregoing has outlined the more pertinent and important features of the present system in order that the detailed description of the system that follows may be better understood, and the present contributions to the art may be more fully appreciated. It is of course not possible to describe every conceivable combination of components and/or methodologies, but one of ordinary skill in the art may recognize that many further combinations or permutations are possible. Accordingly, the novel architecture described below is intended to embrace all such alterations, modifications, and variations that fall within the spirit and scope of the appended claims.

BRIEF DESCRIPTION OF THE DRAWINGS

The invention may be more completely understood in consideration of the following detailed description of various embodiments of the invention in connection with the accompanying drawings, in which.

DETAILED DESCRIPTION OF THE SEVERAL EMBODIMENTS

Figure 1:
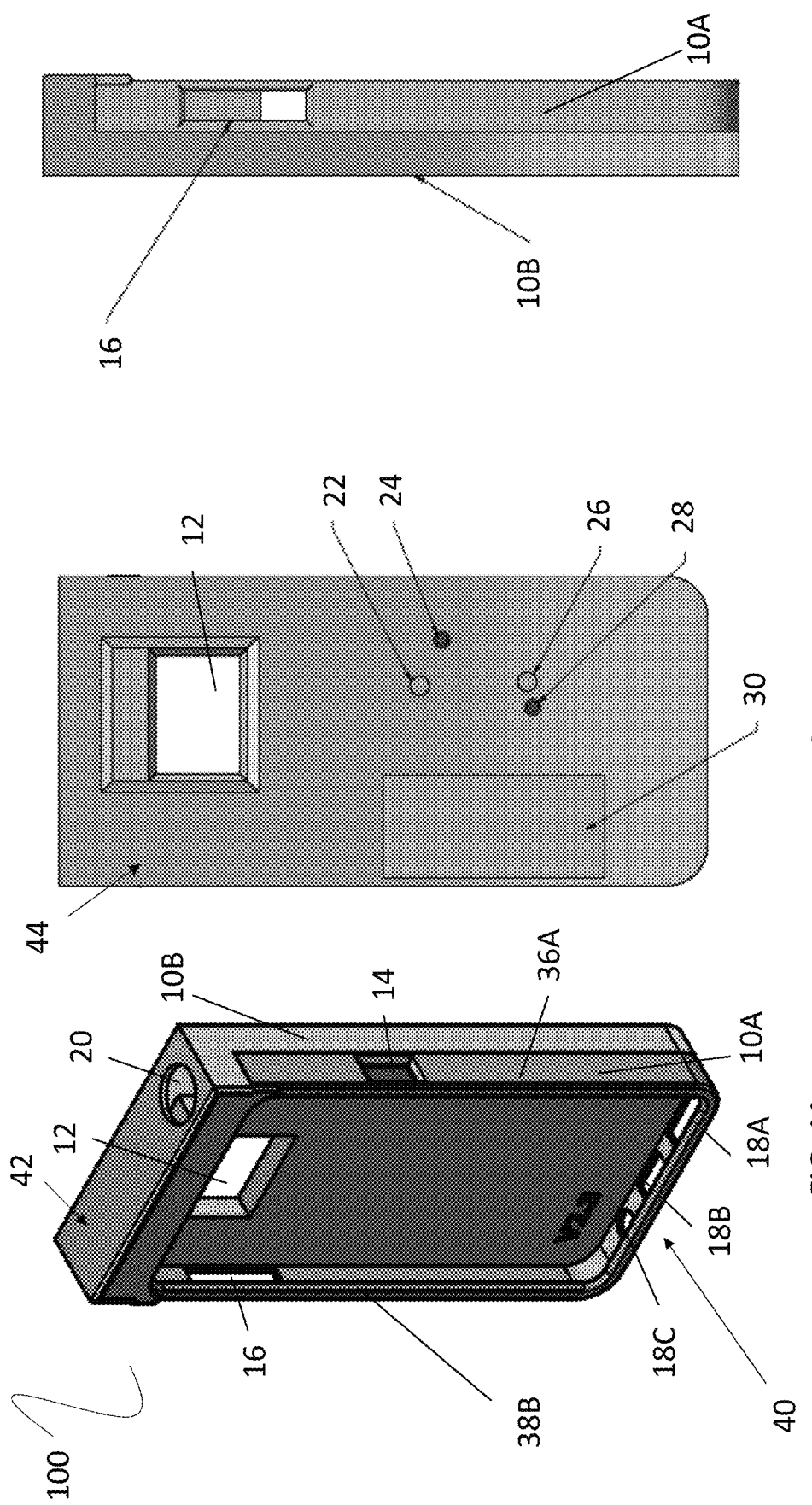
FIG. 1A illustrates a schematic diagram showing a perspective view of a front case and a proximity sensor circuitry housing.
FIG. 1B illustrates a schematic diagram showing a back view of a proximity sensor circuitry housing.
FIG. 1C illustrates a schematic diagram showing a side view of a front case and a proximity sensor circuitry housing.

The detailed description set forth below in connection with the appended drawings is intended as a description of several embodiments of the apparatus and does not represent the only forms in which the present apparatus may be constructed and/or utilized. The description sets forth the functions and the sequence of steps for constructing and operating the apparatus in connection with the illustrated embodiments. However, it is to be understood that the same or equivalent functions and sequences may be accomplished by different embodiments that are also intended to be encompassed within the spirit and scope of the invention.

For the following defined terms, these definitions shall be applied, unless a different definition is given in the claims or elsewhere in this specification. All numeric values are herein assumed to be modified by the term "about", whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following description should be read with reference to the drawings wherein like reference numerals indicate like elements throughout the several views. The drawings, which are not necessarily to scale, depict illustrative embodiments of the claimed invention.

Reference will now be made to non-limiting embodiments, examples of which are illustrated in the Figures.

FIG. 1A illustrates a perspective view of a detection apparatus 100 that preferably generates a warning notification when an object is within a preselected distance to a user of a mobile device. In a preferred embodiment, the detection apparatus 100 is an attachable device that couples to a mobile device (see FIG. 4) via a mounting mechanism as an add-on unit, which comprises a front case 10A and a housing 10B which enclosed the sensor circuitry (see FIGS. 2-3). In this embodiment, the front case 10A comprises a lock control hole 14 on one side 38A of a trim of the front case 10A, and a volume control hole 16 on a corresponding side 38B trim of the trim on the front case 10A. Furthermore, in one embodiment, a stylus storage hole 18A, a charging port hole 18B, and a headphone input hole 18C may be provided on a bottom 40 of the front case 10A to provide flexible connections for numerous external devices and components (not shown). In this embodiment, the housing 10B that contains the sensor circuitry comprises a cavity 12 to allow for the use of a camera, microphone and/or flashlight on the mobile device when attached to the detection apparatus 100. Furthermore, the housing includes a top facing sensor 20 embedded in a top 42 trim of the housing 10B, which in the sensor 20 is configured to transmit and receive signals when an object (see FIG. 4) is within a preselected distance to the sensor 20 such that a warning may be triggered to alert the user of the mobile device. In alternate embodiments, the housing 10B and associated sensory circuitry may be fully integrated into a mobile device, including, but not limited to a cell phone.

In some embodiments, the sensor 20 may be selected from the group consisting of an ultrasonic sensor, an infrared sensor, a Lidar sensor, and a Radar sensor to detect and measure the distance between the sensor 20 and an object within a preselected distance.

In some embodiments, the front case 10A may be used as a protective case to prevent damage to the mobile device it is coupled with in the event of a drop, water exposure or other potential damaging events.

In some embodiments, the front case 10A is attached to the mobile device via a snap mechanism, a plurality of magnetic mechanisms, a clamp mechanism, a plurality of adhesives, or a cover that encapsulates the electronic device.

In some embodiments, the front case 10A is made of clear flexible PLA and further comprises a plurality of warning LEDs 22 (see FIG. 2) at the corners of the housing 10B. In this example, when the sensor 20 is triggered, the plurality of LED's illuminates the housing 10B as a visual warning to the user of the mobile device.

FIG. 1B illustrates a back view of the housing 10B. A power source 30 may be installed in the housing to supply electric power to the detection apparatus 100, including, but not limited to a battery or similar power means. In one embodiment, the battery supply can also be used to power the electronic device it is attached to.

In addition, the housing 10B comprises a plurality of buttons and LED indicators on a back surface 44 of the housing 10B. In this embodiment, an off/reset button 24 is a reset button that terminates data collection from the sensor 20 and prevents signal transmission to the LED indicators. Preferably, the off/reset button 24 functions as an off button to deactivate the detection apparatus 100 from any current mode of operation. Furthermore, mode toggle button 28 is provided and is configured as a mode button, which enables a user to cycle through various distance settings with respect to the user of the mobile device and an object (see FIG. 4). For instance, a first click of the toggle button 28 activates a "Green mode" and a corresponding mode LED indicator 26 lights up green letting a user know the current mode of operation. A "Green mode" has a long-range reading distance which gives the user the greatest amount of distance between the housing and a detected object, preferably a distance of twenty-five or greater. The user will be alerted of a detected object when the mode LED indicator 26 flashes green.

The second mode of operation occurs, when pressing the mode toggle button 28 twice to activate a "Blue mode" and mode LED indicator 26 lights up blue to indicate that the user has entered the "Blue mode," which has an intermediate reading distance. The user will be alerted of a detected object when mode LED indicator 26 flashes blue, preferably greater than six feet and less than twenty-five feet.

Lastly, selecting the mode toggle button 28 a third time, activates a "Red mode" and mode LED indicator 26 lights up red to indicate that the user has entered the "Red mode," which has one of the closest distances that the sensor is able to detect. The user will be alerted of a detected object when mode LED indicator 26 flashes red, when an object is six feet or closer to the user of the mobile device. In a preferred embodiment in the "red mode", the selected distance of six feet is utilized to maintain proper social distancing by a user of the detection apparatus from another individual. This distance setting provides the necessary warning and alert to an individual that is within six feet of the user.

If the user of the detection apparatus 100 presses the mode toggle button 28 once more resets the mode which can also be achieved at any time by pressing Red Off/Reset button 24.

In some embodiments, the battery of the power source 30 is selected from the group consisting of Nickel Cadmium (NiCd), Nickel Metal Hybride (NiMH), Lithium Ion (Li-ion), and Lithium Polymer (LiPo).

FIG. 1C depicts a side view of the front case 10A, the housing 10B, and the volume control hole 16.

Figure 2:
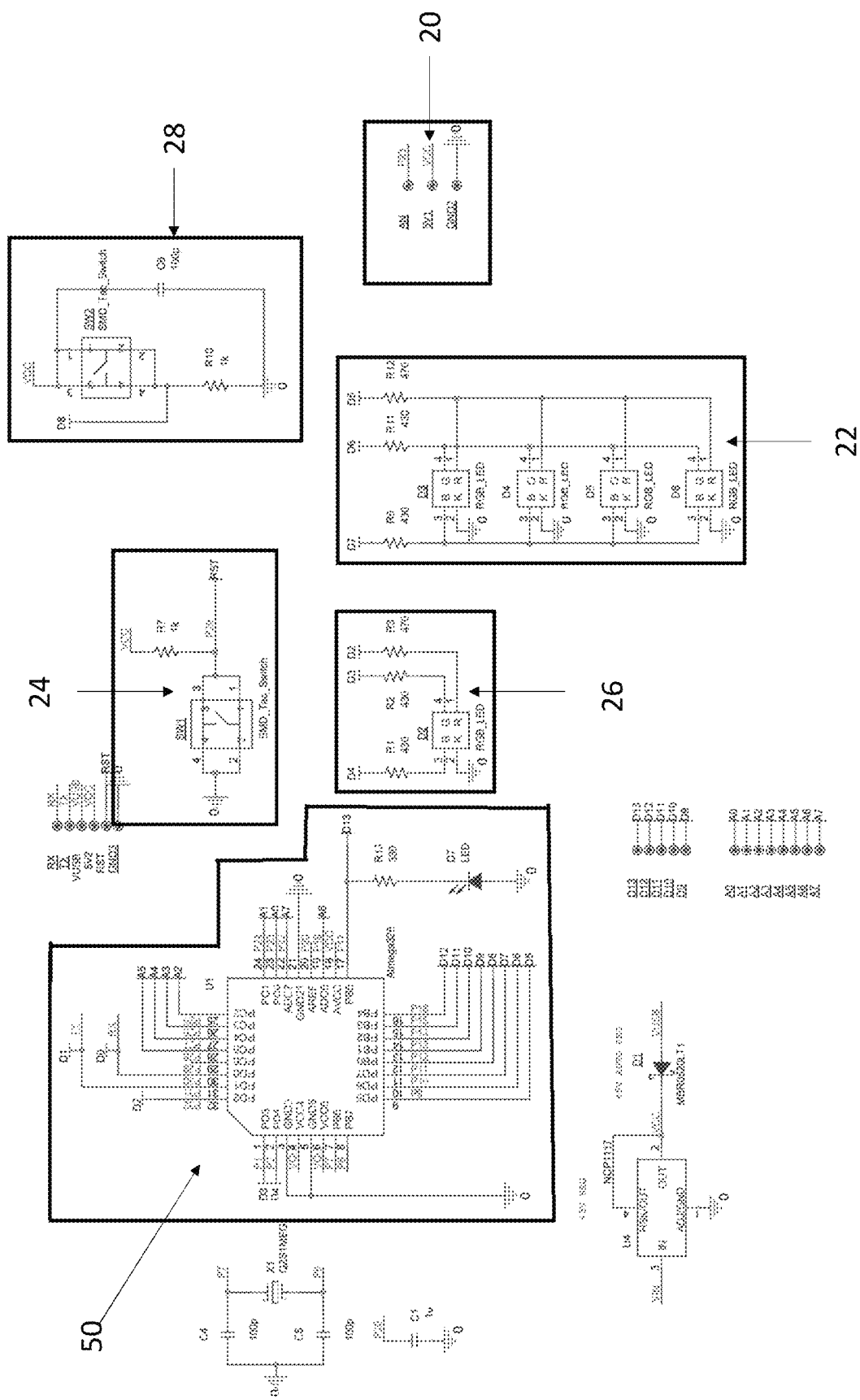
FIG. 2 illustrates a schematic diagram showing a general design for a proximity sensor circuitry.

An overview of a general design for a proximity sensor circuitry housing is shown in FIG. 2. The design may include an ultrasonic sensor, a plurality of nanoelectronics components, a plurality of LED indicators, and a plurality of pushbuttons.

Figure 3:
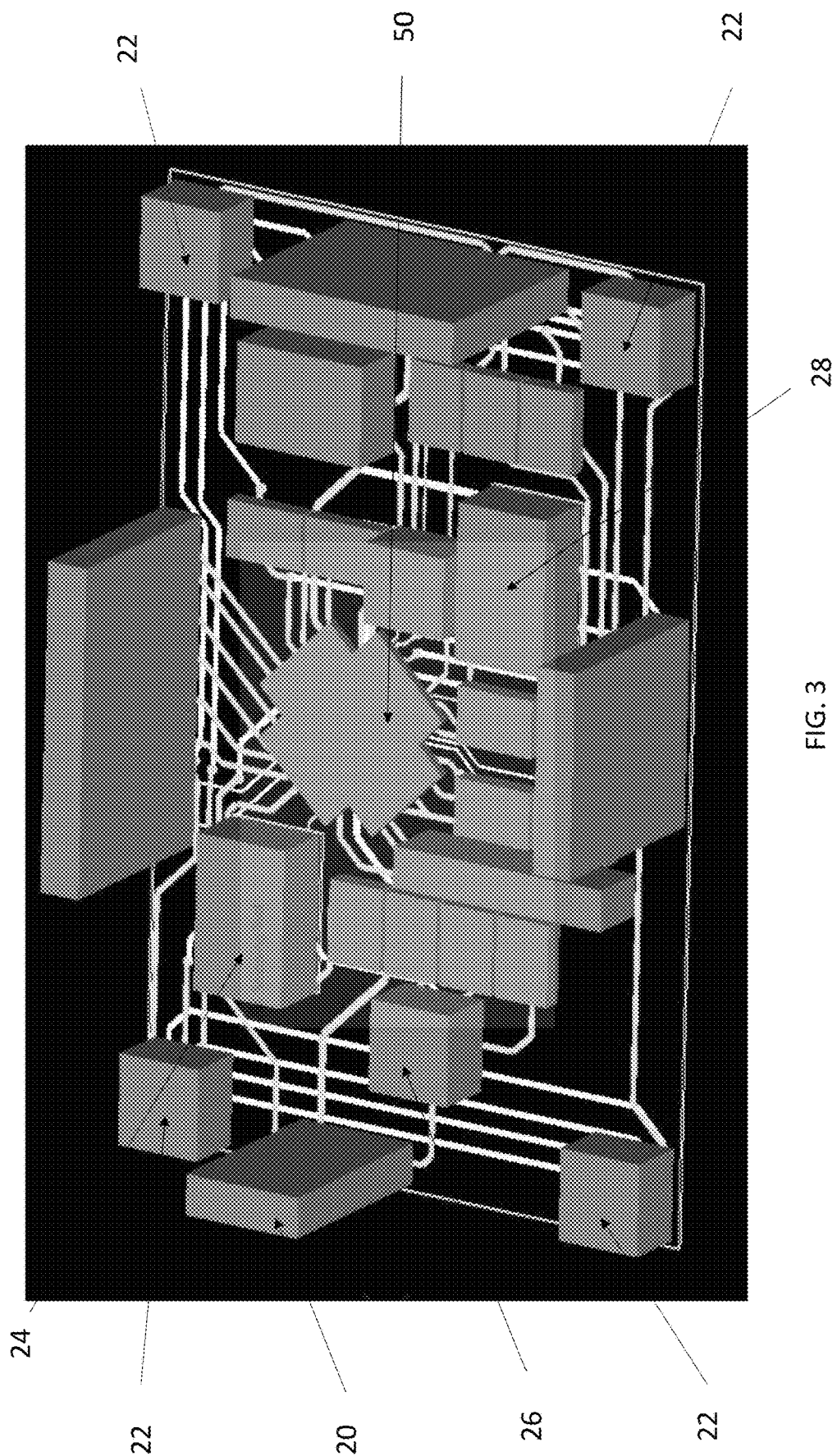
FIG. 3 illustrates a schematic diagram showing a perspective 3D view of a general design for a proximity sensor circuitry housing.

FIG. 3 shows a perspective 3D view of a general design for a proximity sensor circuitry housing in accordance with the invention. In this embodiment, a processing unit (CPU) 50 is included in the housing 10B and preferably runs or executes software programs or instructions stored in memory and to perform various functions for the detection apparatus 100 and to process data. The sensor 20 receives and sends signals and may communicates over one more communication buses or signal lines with the processing unit 50 and the other components to alert a user that they are within proximity of an object based on the distance setting input by the user into the detection apparatus 100.

Figure 4:
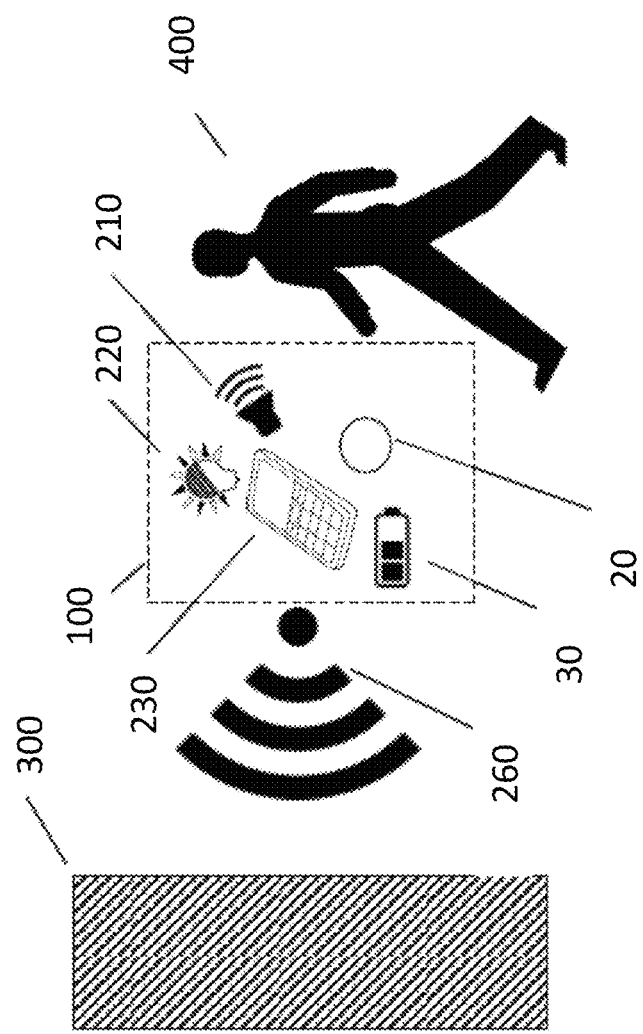
FIG. 4 illustrates a schematic diagram showing the utilization of an apparatus in accordance with the invention.

FIG. 4 illustrates the utilization of the detection apparatus 100 comprising a plurality of sensors 20 that can determine the range of an object 300 in front of the sensors 20 and the power source 30 in accordance with the invention. In some embodiments, the detection apparatus 100 is integrated into a mobile device 230 such as a cell phone to utilize the processing capabilities and human interface components such as a speaker, screen, or haptic feedback to generate warning mechanisms including an audible warning 210 and a visual warning 220 in response to signal 260 transmitted and received by the sensor 20. The sensor 20 is selected from a group consisting of an ultrasonic sensor, an infrared sensor, a Lidar sensor, and a Radar sensor.

Figure 5:
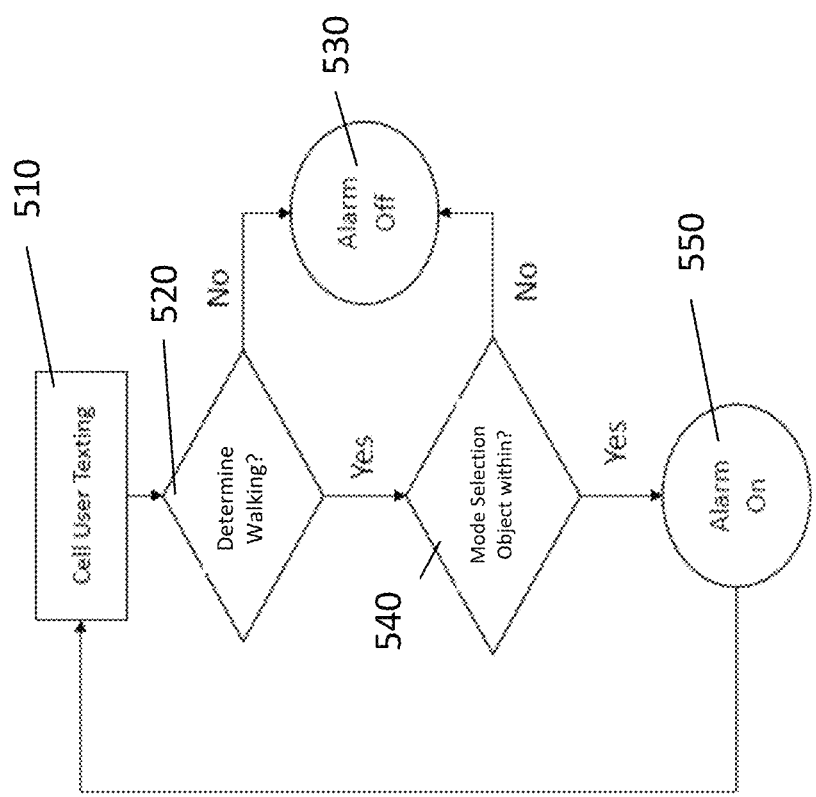
FIG. 5 illustrates a flow chart showing a preferred implementation of an apparatus for detecting objects in front of a user within a preselected distance.

FIG. 5 illustrates a flow chart of a preferred implementation of the detection apparatus 100 to detect an object within a preselected distance using a distance measuring sensor and warn a user which proceeds with the following steps:

At step 510, a cell phone user is texting. At step 520, if the user is not walking while texting, he or she may deactivate the alarm system at step 530. At step 540, if the user is walking while texting, he or she may select a range-based alert mode to increase or decrease the zone of warning. At step 550, if an object is detected within the preselected distance, the apparatus activates an alarm which may trigger a visual, audible, or haptic warning to alert the user.

It should be understood that various alternatives to the embodiments of the disclosure described herein may be employed in practicing the disclosure. Elements of an implementation of the apparatus described herein may be independently implemented or combined with other implementations.

What is claimed is:

1. A detection apparatus configured for use with a mobile device comprising:
    a housing, wherein the housing is attachable to the mobile device and further comprises:
        a sensor configured to detect an object with a preselected distance of the mobile device;
        a power source;
        a mode toggle button, wherein the mode toggle button allows for the selection of a plurality of distance settings between the object and the mobile device; and wherein the plurality of distance settings is configured to detect and determine a range of the object within the preselected distance selected from the group consisting of: long-range, intermediate, and close;
        a mode LED indicator;
        a plurality of warning LED indicators to alert a user of the mobile device when an object is within the preselected distance to the mobile device; and
        a processing unit to receive a signal from the sensor based on the preselected distance setting.

2. The detection apparatus configured for use with a mobile device of claim 1, wherein the detection apparatus further comprises a front case attached to the housing.

3. The detection apparatus configured for use with a mobile device of claim 1, wherein the sensor is selected from the group consisting of: ultrasonic, infrared, Lidar, and Radar.

4. The detection apparatus configured for use with a mobile device of claim 1, wherein the mode LED indicator changes color corresponding to the distance setting input in the mode toggle button.

5. The detection apparatus configured for use with a mobile device of claim 1, wherein the long-range distance setting detects objects at twenty-five feet or greater away from the mobile device.

6. The detection apparatus configured for use with a mobile device of claim 1, wherein the intermediate distance setting detects objects at greater than six feet and less than twenty-five away from the mobile device.

7. The detection apparatus configured for use with a mobile device of claim 1, wherein the close distance setting detects objects at six feet or less away from the mobile device.

8. The detection apparatus configured for use with a mobile of claim 1, wherein the power source is a battery selected from the group consisting of: Nickel Cadmium (NiCd), Nickel Metal Hybride (NiMH), Lithium Ion (Li-ion), and Lithium Polymer (LiPo).

9. A method for alerting a user of a mobile device to an object at a preselected distance utilizing the detection apparatus of claim 1, comprising the steps of:
 activating the detecting apparatus;
 select a distance setting;
 detecting an object based on the distance setting; and
 alerting the user of the mobile device mode when an object is detected within the preselected distance by triggering a warning to alert the user.

* * * * *